(12) United States Patent
Allen et al.

(10) Patent No.: US 11,057,382 B2
(45) Date of Patent: Jul. 6, 2021

(54) COMPUTING DEVICES AND METHODS FOR PROPAGATING UPDATES TO USER PROFILE DATA

(71) Applicant: MASTERCARD INTERNATIONAL INCORPORATED, Purchase, NY (US)

(72) Inventors: John Allen, Newcastle (IE); Ahmed Hosny, Dublin (IE); Peter J. Groarke, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 296 days.

(21) Appl. No.: 16/170,986

(22) Filed: Oct. 25, 2018

(65) Prior Publication Data

US 2020/0137058 A1    Apr. 30, 2020

(51) Int. Cl.
*H04L 29/06*   (2006.01)
*G06F 21/62*   (2013.01)
*G06F 16/22*   (2019.01)
*G06F 16/23*   (2019.01)

(52) U.S. Cl.
CPC ....... *H04L 63/10* (2013.01); *G06F 16/2282* (2019.01); *G06F 16/2379* (2019.01); *G06F 21/6218* (2013.01); *H04L 63/0478* (2013.01); *H04L 63/08* (2013.01)

(58) Field of Classification Search
CPC ..... H04L 63/10; H04L 63/0478; H04L 63/08; G06F 16/2379; G06F 16/2282; G06F 21/6218
See application file for complete search history.

(56) References Cited

U.S. PATENT DOCUMENTS 7,016,877 B1 * 3/2006 Steele ............... G06Q 20/3674
                                                                 705/50
8,171,531 B2   5/2012 Buer
(Continued)

FOREIGN PATENT DOCUMENTS

WO    2018190953 A1    10/2018

OTHER PUBLICATIONS

PCT International Search Report and Written Opinion, Application No. PCT/US2019/051854, dated Jan. 3, 2020, 10 pps.

*Primary Examiner* — Darshan I Dhruv
(74) *Attorney, Agent, or Firm* — Armstrong Teasdale LLP

(57) ABSTRACT

A data update computing device is provided. The data update computing device receives, from one of a user computing device and a first relying party computing device, a first access authorization message, wherein the first access authorization message identifies (i) a first relying party and (ii) a first user data element of the user to be shared with the first relying party. The data update computing device generates a first globally unique identifier (GUID), wherein the first GUID is uniquely associated in a first record in a GUID database table with the first user data element and the first relying party; receives an updated value of the first user data element of the user; stores the updated value of the first user data element in the first record, and flag the first record as updated in the GUID database table; and transmits the first GUID to the first relying party.

17 Claims, 6 Drawing Sheets

(56) References Cited

U.S. PATENT DOCUMENTS

| | | | |
|---|---|---|---|
| 8,266,421 B2 * | 9/2012 | Sidman | H04L 9/0825 |
| | | | 713/150 |
| 9,292,707 B1 * | 3/2016 | Fontecchio | H04L 9/30 |
| 9,306,930 B2 | 4/2016 | Keys et al. | |
| 9,864,877 B1 | 1/2018 | Chaganti et al. | |
| 10,728,361 B2 * | 7/2020 | Lepore | H04L 63/0428 |
| 2005/0021398 A1 * | 1/2005 | McCleskey | H04L 67/1082 |
| | | | 705/14.47 |
| 2005/0114672 A1 | 5/2005 | Duncan et al. | |
| 2005/0193093 A1 * | 9/2005 | Mathew | G06Q 30/02 |
| | | | 709/219 |
| 2007/0067309 A1 * | 3/2007 | Klein, Jr. | G06Q 30/0635 |
| 2007/0276836 A1 | 11/2007 | Chatterjee et al. | |
| 2009/0041249 A1 * | 2/2009 | Tanaka | H04L 9/0891 |
| | | | 380/277 |
| 2010/0199098 A1 | 8/2010 | King | |
| 2011/0035558 A1 * | 2/2011 | Leon | G06F 11/1435 |
| | | | 711/154 |
| 2012/0079019 A1 | 3/2012 | Miettinen et al. | |
| 2013/0208893 A1 | 8/2013 | Shablygin et al. | |
| 2013/0318347 A1 * | 11/2013 | Moffat | H04L 9/0894 |
| | | | 713/168 |
| 2013/0322632 A1 * | 12/2013 | Manges | H04L 9/0816 |
| | | | 380/285 |
| 2014/0006512 A1 | 1/2014 | Huang et al. | |
| 2014/0258727 A1 * | 9/2014 | Schmit | G06F 21/445 |
| | | | 713/182 |
| 2015/0088759 A1 * | 3/2015 | Bailey | G06Q 20/3829 |
| | | | 705/71 |
| 2015/0331736 A1 * | 11/2015 | Kawasumi | G06F 11/079 |
| | | | 714/37 |
| 2016/0048698 A1 | 2/2016 | Sahu et al. | |
| 2016/0094530 A1 * | 3/2016 | Mihaylov | H04L 63/10 |
| | | | 726/7 |
| 2016/0125405 A1 * | 5/2016 | Alterman | G06Q 20/42 |
| | | | 705/44 |
| 2016/0149986 A1 * | 5/2016 | Ding | H04L 67/02 |
| | | | 709/217 |
| 2017/0034289 A1 | 2/2017 | Theobald et al. | |
| 2018/0020005 A1 * | 1/2018 | Beiter | H04L 9/3213 |
| 2018/0048674 A1 * | 2/2018 | Black | H04W 12/03 |
| 2018/0218121 A1 * | 8/2018 | Gassner | G06Q 30/018 |
| 2018/0219846 A1 * | 8/2018 | Poschel | H04L 63/0807 |
| 2019/0394041 A1 * | 12/2019 | Jain | H04L 63/08 |

\* cited by examiner

COMPUTING DEVICES AND METHODS FOR PROPAGATING UPDATES TO USER PROFILE DATA

BACKGROUND

The present disclosure relates generally to information networks and, more particularly, to computer systems and computer-based methods for propagating updates regarding one or more elements of a user's data profile to relying parties.

Consumers may move to a new residence or change other aspects of their personal profile, leading to frequent changes in the consumer's personal profile (e.g., addresses and phone numbers). Consumers also increasingly expect delivery, subscription services, or other services from merchants that require the merchant to have updated profile data in order to complete the service. For example, consumers may place a recurring order for common household items and desire uninterrupted service despite changes in address, or may order delivery over the Internet from new restaurants but not wish to transmit their phone number openly each time due to risk of interception by an unauthorized third party. Outdated user data may result in costly incorrect deliveries and missed notifications. When a subscribed service provider only has outdated contact information to work from, or when the user has to update many service providers for each change in a data element, propagation of updated user data may be excessively time consuming and/or error-prone. There is a need for user's changed data elements to be updated to authorized merchants or other relying parties without the user being required, for each change, to transmit the information separately to each merchant and/or to provide the data over an unsecure communications channel. Moreover, the user may wish to limit the profile data available to specific merchants on an element-by-element basis to reduce a risk of data compromise by unauthorized third parties.

BRIEF DESCRIPTION

In one aspect, a data update computing device is provided. The data update computing device includes at least one processor in communication with a database. The database is configured to store a plurality of user data elements of a user. The data update computing device is configured to receive, from one of a user computing device and a first relying party computing device, a first access authorization message. The first access authorization message identifies (i) a first relying party and (ii) a first of the user data elements of the user to be shared with the first relying party. The data update computing device is also configured to create, in response to the first access authorization message, a first record in a GUID database table. The first record associates a first globally unique identifier (GUID), the first user data element, and the first relying party. The data update computing device is further configured to receive, and store in the database, an updated value of the first user data element of the user. Additionally, the data update computing device is configured to flag the first record as updated in the GUID database table, and transmit the first GUID to the first relying party.

In another embodiment, a computer-implemented method for propagating updates to user profile data is provided. The user profile data includes user data elements of a user. The method is implemented using a data update computing device in communication with a database. The method may be implemented using a data update computing device. The method includes receiving, from one of a user computing device and a first relying party computing device, a first access authorization message. The first access authorization message identifies (i) a first relying party and (ii) a first of the user data elements of the user to be shared with the first relying party. The method also includes creating, in response to the first access authorization message, a first record in a GUID database table. The first record associates a first globally unique identifier (GUID), the first user data element, and the first relying party. The method further includes receiving, and storing in the database, an updated value of the first user data element of the user. Additionally, the method includes flagging the first record as updated in the GUID database table, and transmitting the first GUID to the first relying party.

In another embodiment, a non-transitory computer readable medium that includes computer-executable instructions for propagating updates to user profile data is provided. When executed by at least one processor of a data update computing device, the computer-executable instructions cause the at least one processor to receive, from one of a user computing device and a first relying party computing device, a first access authorization message. The first access authorization message identifies (i) a first relying party and (ii) a first of the user data elements of the user to be shared with the first relying party. The computer-executable instructions also cause the at least one processor to create, in response to the first access authorization message, a first record in a GUID database table. The first record associates a first globally unique identifier (GUID), the first user data element, and the first relying party. The computer-executable instructions further cause the at least one processor to receive, and store in the database, an updated value of the first user data element of the user. Additionally, the computer-executable instructions cause the at least one processor to flag the first record as updated in the GUID database table, and transmit the first GUID to the first relying party.

DETAILED DESCRIPTION

Figure 1:
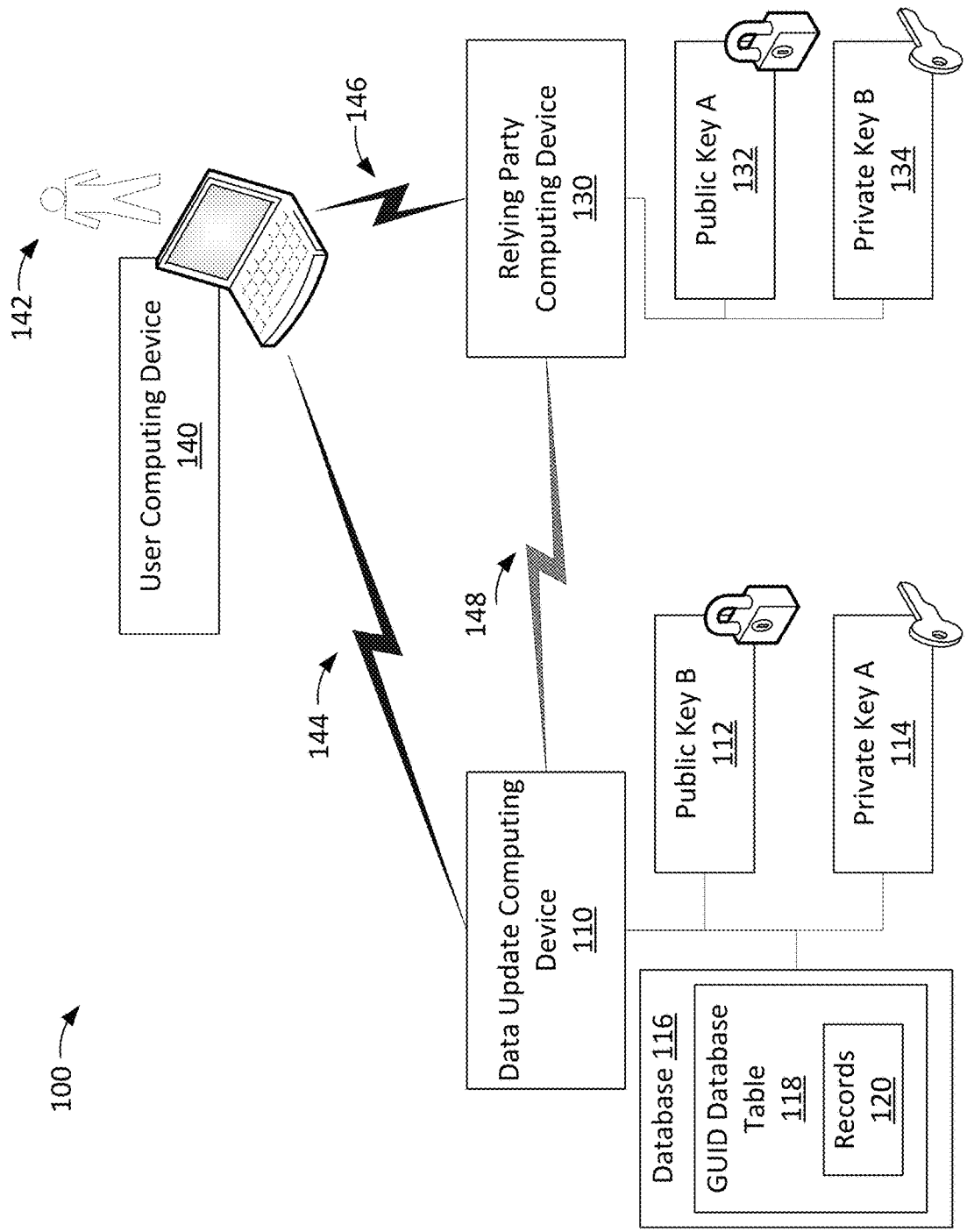
FIG. 1 is a schematic diagram illustrating an example data update computing system.

The following detailed description illustrates embodiments of the disclosure by way of example and not by way of limitation. The description enables one skilled in the art to make and use the disclosure. It also describes several embodiments, adaptations, variations, alternatives, and uses of the disclosure, including what is presently believed to be the best mode of carrying out the disclosure.

A data update computing device is described herein. In the example embodiment, the data update computing device is configured to automatically provide updates for changed user data elements to at least one relying party. The relying parties may include a merchant, a financial institution, or any other party authorized by the user.

A user's personal profile typically includes a number of individual data elements, such as home street address, home city and state, e-mail address, and one or more phone numbers. In some known systems, a user who has any change to profile data, such as a new address, must enter the updated data, including personally identifiable information, into a plurality of web pages provided by a plurality of corresponding relying parties, and the user data may be transmitted to some or all of the relying parties over an unsecure communication channel.

By contrast, the system of the present disclosure includes a database in which a participating user's data elements are stored. The user grants an access authorization to share updates to at least one of the user's data elements with a relying party. For each shared data element, a corresponding globally unique identifier (GUID) is generated and associated in a database table with the relying party and the data element. Participating users have access to the database and may update one or more of their data elements conveniently in a single action at this single database location. A data update computing device also has access to the database. For example, the database may be locally stored in a memory device of the data update computing device, or stored remotely and communicatively coupled to the data update computing device. In response to the user entering an update to one of the user's data elements in the database, or in response to an authorized relying party querying the data update computing device for updates, the data update computing device transmits the GUID associated with the updated user data element and the relying party over any convenient, potentially unsecure communications channel. The GUID contains no personally identifiable information and, in isolation, does not identify the associated user to anyone who was not previously privy to the creation of the GUID. Each relying party is thus notified about the update of the user data element in a fashion that reduces a risk of compromise of the user's profile. The relying party may receive the updated data element value along with the GUID, or the relying party may later use the GUID to retrieve the updated value of the user data element from the single repository through the data update computing device. Moreover, in some embodiments, the actual user data element may be sent or retrieved over a secure connection (e.g., a virtual private network connection) between the relying party and the data update computing device. Other data elements of the user's profile, not associated with the GUID, are not included in the data update sent to the relying party.

In at least some embodiments, the user data is personally identifiable information (PII), and the data update computing system obtains opt-in informed consent from users for data usage by the system consistent with applicable consumer protection laws and privacy regulations. Users may be provided with an opportunity to control whether such information is collected or to control whether and/or how such information is used. In addition, certain data may be processed in one or more ways before it is stored or used, so that personally identifiable information is removed and/or anonymized.

Participation in the present system thus enables the relying party to access or receive the updated user data element (but not other data of the user) from a single repository on an as-needed basis (subject to the type of authorization provided by the user). Thus, using the system of the present disclosure, the user's profile, including personally identifiable information, is much less likely to be compromised by the transmission, and the relying party has a greatly reduced risk of acting on stale or outdated user data.

The technical problems addressed by the disclosure include at least one of: (i) data, such as personally identifiable information, being intercepted by unauthorized parties when transmitted over unsecure communication channels, (ii) unauthorized data access using intercepted authentication data (e.g., replay attacks), and (iii) service errors due to reliance on inaccurate or outdated data.

The present disclosure solves these problems through technical effects including at least one of: (i) receiving, from one of a user computing device and a first relying party computing device, a first access authorization message, wherein the first access authorization message identifies (a) a first relying party and (b) a first of the user data elements of the user to be shared with the first relying party; (ii) generating a first GUID uniquely associated in a first record in a GUID database table with the first user data element and the first relying party; (iii) receiving an updated value of the first user data element of the user; (iv) storing the updated value of the first user data element in the first record, and flagging the first record as updated in the GUID database table; and (v) transmitting the first GUID to the first relying party.

The resulting technical benefits achieved by the systems and methods of the disclosure include at least one of: (i) increased network data security (ii) reduced risk of interception of sensitive data on unsecure networks, (iii) sensitive data transmission moved to a secure network, (iv) detection of replay attacks, and (v) increased data accuracy due to centralization of user data updates in a single repository.

Figure 2:
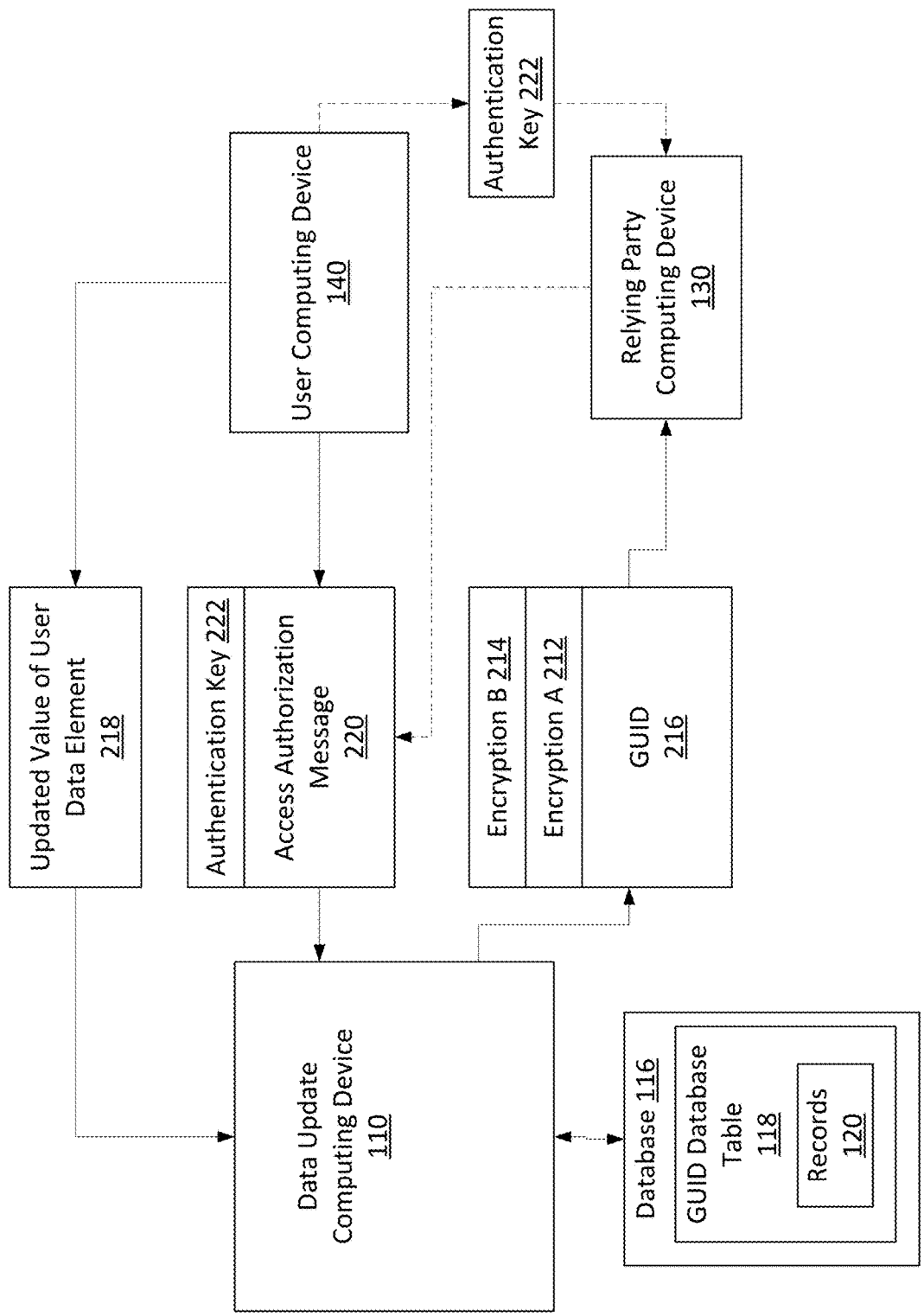
FIG. 2 is a simplified data flow diagram for a user data update authorization process among a data update computing device, a user computing device, and a relying party computing device of the data update computing system shown in FIG. 1.

FIG. 1 is a schematic diagram of an example data update computing system 100. FIG. 2 is a simplified data flow diagram for an example user data update authorization process among a data update computing device 110, a user computing device 140, and a relying party computing device 130 of data update computing system 100. More specifically, data update computing system 100 includes data update computing device 110, relying party computing device 130, and user computing device 140 in communication with each other.

Data update computing system 100 may store user data, including personally identifiable information in some embodiments, on behalf of a plurality of users 142 in a database 116. For example, database 116 may store email addresses, mailing addresses, phone numbers, financial account numbers (e.g., primary account numbers such as debit card numbers or credit card numbers of a payment card associated with the user), and any other elements of personal data associated with each user 142. The aggregated data associated with each user 142 stored in database 116 or other remote device accessible to data update computing device 110 may be referred to as a "digital persona" or user data of user 142.

Third parties, such as a relying party, may be authorized to request or receive user data updates from a particular user 142. However, directly communicating user data (e.g., a mailing address) by user 142 to relying party computing device 130 may be time consuming and error-prone. Additionally, it may be unsecure for the user 142 to directly provide the requested user data to relying party computing device 130. For example, the communication channel may be public or unsecured. Instead, in the example embodiment, user 142 may authorize the relying party computing device 130 to receive or retrieve updates to specific data elements of the user's data from database 116 via data update computing device 110, potentially over a secure channel and potentially at a later time.

In operation, data update computing device 110 receives an access authorization message 220. In the example embodiment, access authorization message 220 is configured to authorize access by a designated relying party computing device 130 to updates of solely one or more selected elements of the user data of user 142, rather than to updates of all user data of user 142. For example, access authorization message 220 may include identifiers of selected elements of the user data for which updates will be shared with relying party 130, such as "address1;email2;" to indicate that a primary mailing address and a secondary email address are the only data elements for which user 142 intends to share updates with the designated relying party computing device 130. For another example, access authorization message 220 may be configured to share updates to all data elements containing specific types of data (e.g., any email address but no phone number) with the designated relying party computing device 130. In certain embodiments, access authorization message 220 includes a relying party identifier that identifies the designated relying party computing device 130. For example, the relying party identifier may identify a merchant and/or a public key associated with a merchant (e.g., public key B 112). Alternatively, access authorization message 220 identifies the at least one user data element and relying party 130 in any suitable fashion.

In the example embodiment, access authorization message 220 further includes an authentication key 222, which identifies user 142 and user computing device 140 to data update computing device 110. For example, authentication key 222 may be generated by a mobile application associated with data update computing device 110 and executing on user computing device 140, or authentication key 222 may be generated when user 142 logs into a website associated with data update computing device 110 using user computing device 140.

In the example embodiment, data update computing device 110 receives authorization message 220 from user computing device 140 through a communication channel 144. In alternative embodiments (shown in dashed lines in FIG. 2), data update computing device 110 receives authorization message 220 from relying party 130 through a communication channel 148. For example, relying party 130 may have acquired authentication key 222 from user 142 as part of an on-line or point-of-sale interaction between user 142 and relying party 130, in which user 142 authorizes relying party 130 to receive updates of the selected at least one user data element, and relying party 130 may then send access authorization message 220 directly to data update computing device 110.

In the example embodiment, in response to receiving access authorization message 220, data update computing device 110 generates a globally unique identifier (GUID) 216 corresponding to each user data element identified in access authorization message 220. Alternatively, data update computing device 110 generates GUIDs 216 for each user data element at any suitable time and subsequently assigns GUIDs 216 to an authorized relying party 130 as needed. For purposes of this disclosure, the term "globally unique" means that GUID 216 for each data element of a user's data is unique as compared to GUID 216 for other data elements of the same user's data, and unique as compared to GUID 216 for data elements of other users' data. For example, each GUID 216 is generated as a random value. Therefore, once generated, GUID 216 can be used to identify not just a particular user 142 or all profile data for the particular user 142, but rather to uniquely identify a particular data element of the particular user's data profile. Moreover, in the example embodiment, GUID 216 for a particular data element of a particular user 142 is unique for different relying parties 130. For example, a user 142 authorizes data update computing device 110 (e.g., via two access authorization messages 220) to send updates to a first data element (e.g., primary phone number) of the user's data to both a first relying party 130 and a second relying party 130. Data update computing device 110 generates a first GUID 216 corresponding to the first data element and the first relying party 130, and a second GUID 216 corresponding to the first data element and the second relying party 130. The first GUID 216 is different from the second GUID 216 because they are associated with different relying parties 130, although they are associated with the same data element of the same user. Thus, the globally unique nature of the GUID 216 reduces an impact of a potential data security breach of any one of relying parties 130. Moreover, if GUID 216 is intercepted by an unauthorized party and utilized in a fraudulent attempt to access user data, the globally unique nature of GUID 216 enables identifying which relying party 130 was the subject of the interception. Each GUID 216 is usable only by the specific relying party 130 designated in access authorization message 220 to obtain solely a user data element specified in access authorization message 220. Each GUID 216 is not usable by the designated relying party 130 (or a fraudulent impersonator of the designated relying party 130) to obtain any additional user data elements.

In the example embodiment, in response to access authorization message 220, data update computing device 110 transmits the GUID 216 corresponding to each user data element identified in access authorization message 220 to the designated relying party 130. Alternatively, in response to access authorization message 220, data update computing device 110 transmits the GUID 216 corresponding to each user data element identified in access authorization message 220 to the corresponding user computing device 140, and user computing device 140 forwards GUID 216 to the designated relying party 130. The designated relying party 130 associates, in the relying party's records, the received GUID 216 with the user data element for the corresponding user 142. For example, the transmission of GUID 216 in response to access authorization message 220 also includes an identifier that enables relying party 130 to link GUID 216 to the corresponding access authorization message 220, and therefore to the corresponding user 142 and corresponding user data element.

In some embodiments, to further enhance data security, GUID 216 is transmitted in encrypted form. For example, GUID 216 may include at least two levels of encryption, based at least in part on a public/private encryption scheme (e.g., asymmetric encryption, RSA encryption, and Public-key cryptography). As used herein, RSA refers to Rivest-Shamir-Adleman encryption using a public-private key pair.

Figure 3:
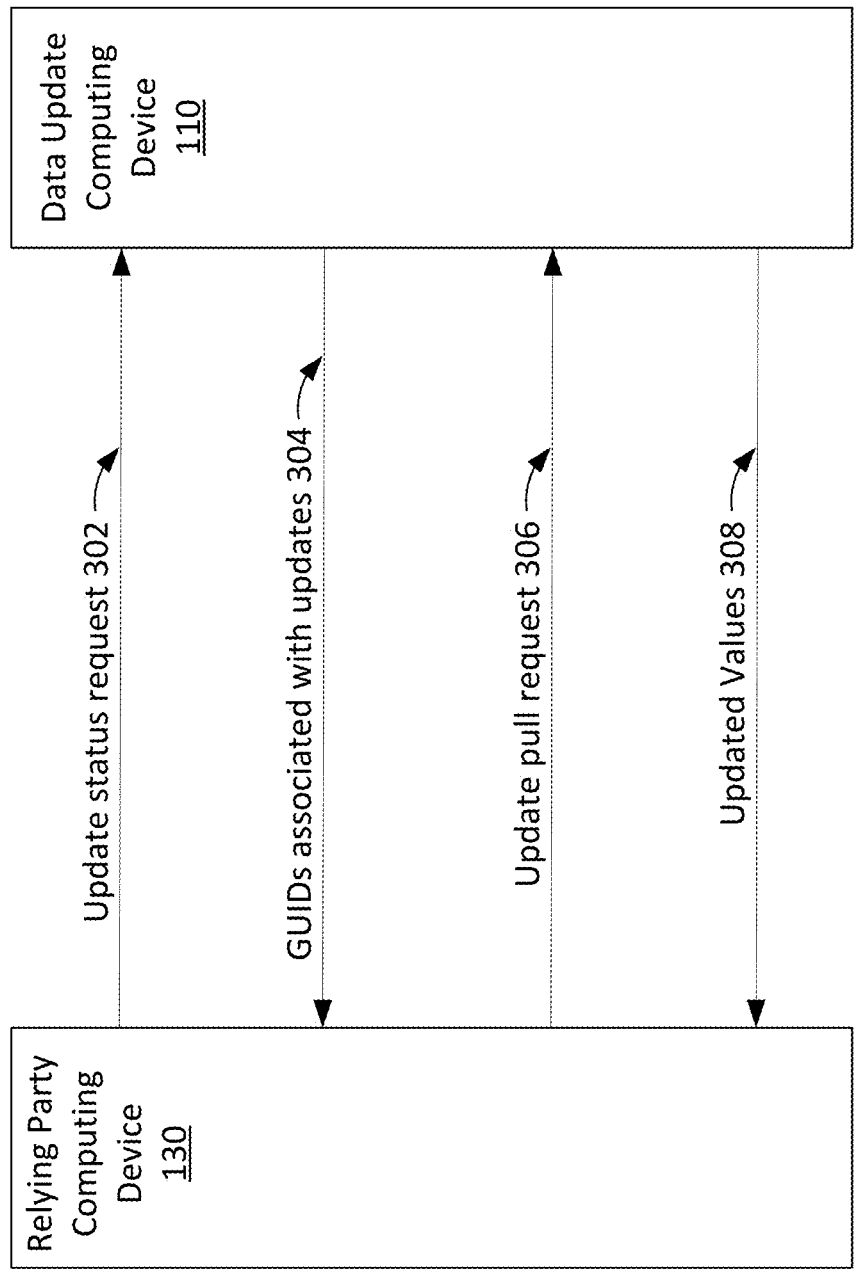
FIG. 3 is a simplified data flow diagram for a user data update sharing process between the data update computing device and the relying party computing device shown in FIG. 1.

In the example embodiment, GUID 216 is encrypted using a public/private key architecture, as shown in FIGS. 2 and 3. First, GUID 216 is encrypted with a private key A 114, the private key of data update computing device 110, in a first layer of encryption illustrated as encryption A 212. Encryption A 212 is reversible using public key A 132 of data update computing device 110. Encryption A 212 indicates that GUID 216 was generated (i.e., signed) by a system storing private key A 114. In other words, encryption A 212 confirms that GUID 216 was properly generated by data update computing device 110, such that a fraudulent GUID not generated by data update computing device 110 may be identified.

In the example embodiment, A-encrypted GUID 216 (i.e., GUID 216 after encryption A 212 is applied) is encrypted with a public key B 112 of relying party 130 in a second layer of encryption, designated as encryption B 214, to generate double-encrypted GUID 310. Encryption B 214 is reversible using the complementary private key of relying party 130 (private key B 134), such that GUID 216 is only accessible by a system storing private key B 134. In other words, encryption B 214 confirms that only relying party computing device 130 will be able to access GUID 216.

Key A is associated with data update computing device 110, thus private key A 114 is stored by data update computing device 110. Relying party computing device 130 stores the public counterpart to private key A, public key A 132. Additionally, key B is associated with the relying party, thus private key B 134 is stored by relying party computing device 130. Public key B 112 is accessible by data update computing device 110. In certain embodiments, public keys (e.g., public key B 112, public key A 132) may not be directly stored by data update computing device 110 and/or relying party computing device 130. In one embodiment, public keys are retrieved as needed from a key server, key database, and/or certificate authority.

In response to receipt of double-encrypted GUID 216, relying party computing device 130 reverses encryption B 214 using private key B 134 to recover the A-encrypted GUID 216. Notably, third parties lacking access to private key B 134 cannot reverse encryption B 214 and, thus, cannot recover the A-encrypted GUID 216. In some embodiments, relying party computing device 130 is configured to also use public key A 132 to validate that GUID 216 was generated by data update computing device 110. In other words, if the recovered A-encrypted GUID 216 can be decrypted using public key A 132, then GUID 216 must have been generated by a system with access to private key A 114, thus validating that GUID 216 was generated by data update computing device 110.

In the example embodiment, data update computing device 110 also creates, in response to access authorization message 220, at least one record 120 in a GUID database table 118. Each record 120 associates GUID 216, a corresponding user data element identified in access authorization message 220, and relying party 130 designated in access authorization message 220. Thus, GUID database table 118 includes a plurality of records 120 containing various data elements of a plurality of users 142 for which update access for any relying party 130 has been authorized, and each record 120 includes a globally unique GUID. In the example embodiment, data update computing device 110 also links each record 120 to the user data stored in database 116 for the associated user 142. For example, record 120 further includes an identifier of the corresponding user 142. For another example, the user data stored in database 116 for each user 142 includes a field to identify GUIDs 216 associated with the user 142. Alternatively, data update computing device 110 links each record 120 to the user data stored in database 116 for the associated user 142 in any suitable fashion.

In the example embodiment, data update computing device 110 is configured to receive, and store in database 116, at least one updated value 218 for a corresponding at least one user data element of user 142. The transmission of updated value 218 also includes an identification of the user data element associated with updated value 218. For example, the at least one updated value 218 is presented in a sequence corresponding to the at least one user data element (e.g., the at least one user data element is "phone1; email2;" and the at least one updated value 218 is "123 Main Street;johndoe@domain.com;"). In some cases, the at least one updated value 218 is transmitted by user 142 from user computing device 140 simultaneously along with access authorization message 220. In other cases, updated value 218 is transmitted by user 142 from user computing device 140 separately from, and at a later time than, access authorization message 220. Alternatively, updated value 218 is transmitted to data update computing device 110 in any suitable fashion.

In the example embodiment, in response to receiving the at least one updated value 218, data update computing device 110 flags records 120 associated with the identified at least one user data element. For example, for each updated value 218, data update computing device 110 parses GUID database table 118, identifies records 120 associated with the corresponding identified user data element, and flags the identified records 120 as associated with an updated value 218. Because each updated value 218 may be associated with more than one record 120 (e.g., different GUIDs 216 for different relying parties 130 for the same corresponding user data element), multiple records 120 may be flagged for each updated value 218. In some embodiments, data update computing device 110 flags record 120 by modifying record 120 to include updated value 218 or a direct link to updated value 120. Alternatively, data update computing device 110 flags record 120 via a logical indicator.

FIG. 3 is a simplified data flow diagram for an example user data update sharing process between the data update computing device and a relying party computing device of the data update computing system. With reference to FIGS. 1 and 3, in the example embodiment, data update computing device 110 signals an availability of updated value 218 to each relying party 130 that is authorized to receive updates of the corresponding user data element by transmitting GUID 216 in each of the flagged records 120 to the corresponding relying party 130. GUIDs 216 associated with updated values 218 may be pushed to, or pulled by, each relying party computing device 130 in any suitable fashion.

For example, in some embodiments, relying party computing device 130 periodically pulls GUIDs 216 associated with updates by transmitting an update status request 302 identifying the relying party to data update computing device 110. In some cases, update status request 302 is signed using private key B 134 to facilitate verification by data update computing device 110 of the source of the update status request, and/or is encrypted using public key A 132 to ensure that only data update computing device 110 can access the content of the request. In response to the update status request, data update computing device 110 parses GUID database table 118 to identify all flagged records 120 associated with relying party 130, and extracts GUIDs 216 from the flagged records. As described above, flagged records 120 are the records containing user data elements associated with updated values 218. Data update computing device 110 then transmits 304 the extracted GUIDs 216 associated with updates to the relying party 130 in response to update status request message 302.

For example, a first relying party 130 and a second relying party 130 are both authorized to receive updates of a primary address data element for a particular user 142. Thus, first relying party 130 is in possession of a first GUID 216 associated with the user's primary address, and second relying party 130 is in possession of a second GUID 216 associated with the user's primary address. User 142 submits an update of the primary address to data update computing device 110. Data update computing device 110 parses GUID database table 118 to identify records 120 associated with the primary address of that user 142, identifies and flags a first record associated with the first GUID and the first relying party, and a second record associated with the second GUID and the second relying party. Each relying party subsequently transmits an update status request 302 to data update computing device 110. In response, data update computing device 110 parses GUID database table 118 to identify flagged records 120 associated with first relying party 130 and second relying party 130, and identifies the first flagged record associated with first relying party 130 and the first GUID, and the second flagged record associated with second relying party 130 and the second GUID. Data update computing device 110 extracts and transmits 304 the first and second GUIDs to the first and second relying parties, respectively, thereby notifying first and second relying parties 130 that an update is available.

In some embodiments, the extracted GUIDs 216 are double-encrypted as described above, or encrypted in any other suitable fashion, prior to transmission 304. In certain embodiments, update status request 302 and the extracted GUID transmission 304 are transmitted over an unsecured Internet connection. Because GUIDs 216 include no personally identifiable information, GUIDs 216 may be sent over an unsecure communication channel with limited risk. In some embodiments, data update computing device 110 is configured to transmit 304 GUIDs 216 associated with updated values to a representational state transfer (REST)-compliant endpoint maintained by the corresponding relying party 130, facilitating rapid propagation of notice that updates are available. In some embodiments, data update computing device 110 is configured to transmit 304 GUIDs 216 associated with updated values to a representational state transfer (REST)-compliant endpoint maintained by the corresponding relying party 130, facilitating rapid propagation of notice that updates are available. Alternatively, update status request 302 and/or transmission 304 of GUIDs 216 may be sent over secure communication channel 148 (e.g., a virtual private network connection).

For another example, in certain embodiments, data update computing device 110 pushes GUIDs 216 associated with updates to the corresponding relying parties 130. In some such embodiments, data update computing device 110 transmits 304 GUIDs 216 from flagged records 120 to the corresponding relying party 130 substantially immediately in response to flagging the records 120. In other such embodiments, relying party 130 may subscribe to receive push notifications of updates to user data of one or more users 142. Data update computing device 110 maintains, for example in database 116, a watch list of a plurality of subscribed relying parties 130, i.e., each of the subscribed relying parties 130 has authorization to receive updated values 218 associated with at least one of a plurality of users 142. Data update computing device 110 periodically retrieves the watch list from database 116, identifies each relying party 130 in the watch list. Data update computing device 110 then parses GUID database table 118 to identify all flagged records 120 associated with each identified relying party 130 and extracts GUIDs 216 from the flagged records for transmission 304 to the corresponding relying party 130, as described above.

In the example embodiment, after transmission 304 of the extracted GUIDs 216, data update computing device 110 clears the flag from the corresponding records 120, indicating that there are no updated values 218 associated with the corresponding GUID 216 for which relying party 130 has not been notified.

In some embodiments, data update computing device 110 automatically transmits 308 to relying party 130 updated values 218 for all GUIDs 216 included in transmission 304, for example simultaneously with transmission 304. Relying party 130 identifies each GUID 216 in the relying party's records, determines the user 142 and user data element associated with each GUID 216, and updates the relying party's records for the user data element with the updated value (e.g., new primary phone number or new primary email address).

In other embodiments, in response to receipt of GUIDs 216, relying party 130 identifies each GUID 216 in the relying party's records and determines the user 142 and user data element associated with each GUID 216. Thus, transmission of GUID 216, without more, is sufficient to notify relying party 130 that an update to the corresponding user data element for the corresponding user 142 has occurred. As noted above, GUID 216 may be transmitted over an unsecure Internet connection. Relying party 130 then decides whether it wishes to obtain updated value 218 corresponding to each GUID 216, for example based on current account status of, or other business history with, the corresponding user 142. In other words, data update computing device 110 may transmit an update list containing a plurality of GUIDs 216 associated with the relying party 130 identifying user data elements for which updates have occurred, and relying party 130 may elect to obtain updated values 218 for any subset of those user data elements. In the example embodiment, relying party 130 transmits an update pull request 306 including each GUID 216 for which relying party 130 wishes to obtain updated value 218. In response to update pull request 306, data update computing device 110 transmits 308 updated values 218 corresponding to each GUID 216 in update pull request 306. In the example embodiment, data update computing device 110 is configured to transmit 308 updated values 218 to relying party 130 via secure communication channel 148 (e.g., a virtual private network connection).

In some embodiments, GUID 216 is associated in database 116 with a number-of-uses restriction. GUID 216 may enable multiple uses by relying party computing device 130. In some embodiments, update pull request 306 includes a nonce value generated separately for each use of the multi-use GUID 216, thereby preventing a replay attack using GUID 216 intercepted from an earlier update pull request 306 and disguised as a later update pull request. For another example, GUID 216 may be restricted to a single use by relying party computing device 130, in an expectation that a user's data will not be updated frequently.

In certain embodiments, GUID 216 is associated in database 116 with an expiration time. For example, a furniture merchant contracted to build and deliver an item of furniture within a 12-week window may be granted corresponding short-term (e.g., 12 week) access to updates of certain user data elements of the furniture purchaser. In another example, a cellular phone service provider may be granted longer term (e.g., 6 months, 1 year) access to updates of certain user data elements of a sub scriber.

Additionally, or alternatively, data update computing device 110 transmits updated values 218 in encrypted format to enhance the security of updated values 218. For example, data update computing device 110 double-encrypts updated values 218 using private key A 114 and public key B 112, and relying party decrypts updated values 218 using private key B 134 and public key A 132, as described above with respect to GUID 216. In some embodiments, data update computing device 110 is configured to transmit 308 encrypted updated values 218 to a representational state transfer (REST)-compliant endpoint maintained by the corresponding relying party 130, facilitating rapid propagation of updated values 218.

Figure 4:
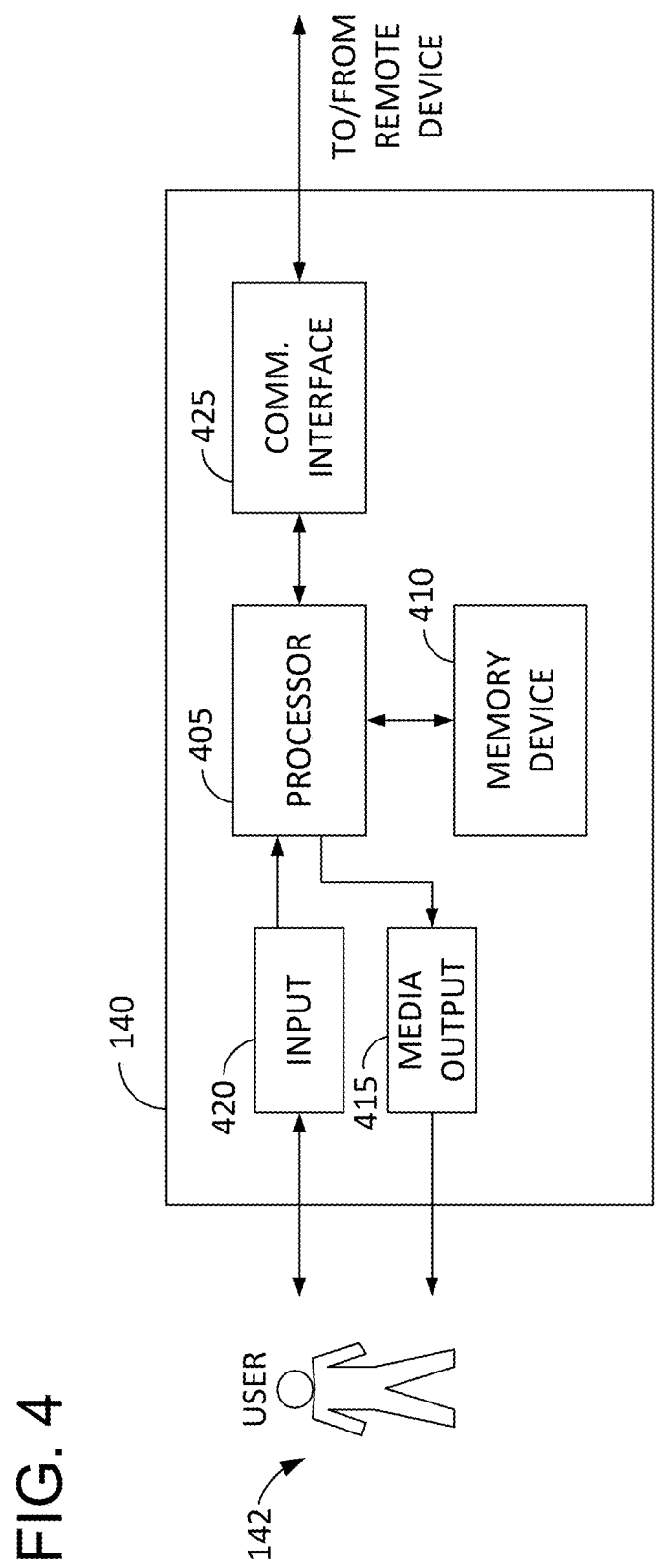
FIG. 4 illustrates an example configuration of the user computing device of the data update computing system shown in FIG. 1.

FIG. 4 illustrates an example configuration of user computing device 140. User computing device 140 includes a processor 405 for executing instructions. In some embodiments, executable instructions are stored in a memory device 410. Processor 405 includes one or more processing units (e.g., in a multi-core configuration). Memory device 410 is any device allowing information such as executable instructions and/or other data to be stored and retrieved. Memory device 410 includes one or more computer-readable media.

User computing device 140 also includes at least one media output component 415 for presenting information to a user 142. Media output component 415 is any component capable of conveying information to user 142. In some embodiments, media output component 415 includes an output adapter, such as a video adapter and/or an audio adapter. An output adapter is operatively coupled to processor 405 and operatively coupleable to an output device such as a display device (e.g., a liquid crystal display (LCD), organic light emitting diode (OLED) display, cathode ray tube (CRT), or "electronic ink" display or an audio output device (e.g., a speaker or headphones). In some embodiments, media output component 415 is configured to present an interactive user interface (e.g., a web browser or client application) to user 142.

In some embodiments, user computing device 140 includes an input device 420 for receiving input from user 142. Input device 420 includes, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 415 and input device 420.

User computing device 140 also includes a communication interface 425, which is communicatively coupleable to a remote device. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in the memory device 410 are, for example, computer-readable instructions for providing a user interface to user 142 via media output component 415 and, optionally, receiving and processing input from input device 420. A user interface may include, among other possibilities, a web browser and a client application. Web browsers enable users 142 to display and interact with media and other information typically embedded on a web page or a website from a web server. A client application allows users 142 to interact with a server application associated with data update computing device 110.

Figure 5:
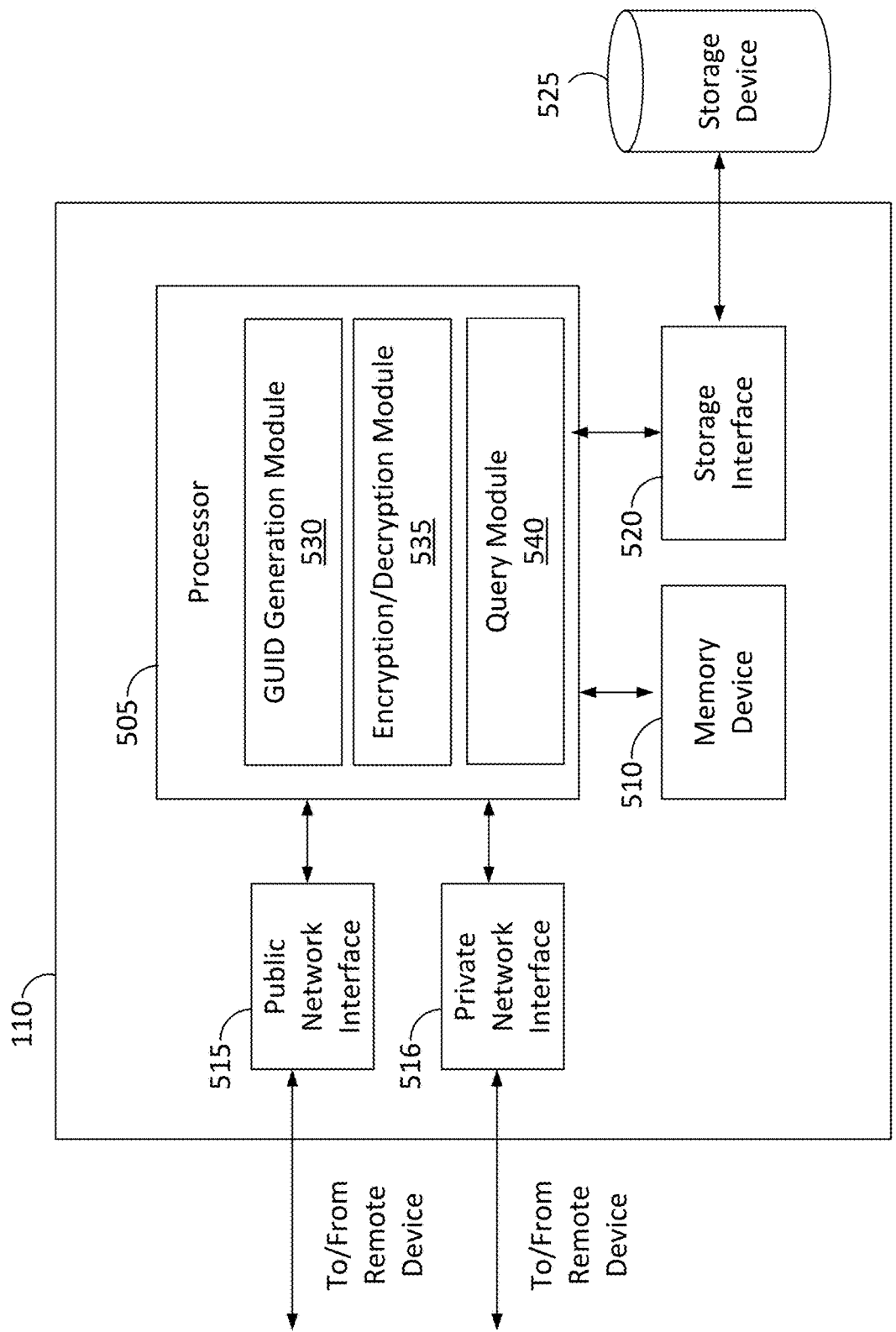
FIG. 5 illustrates an example configuration of the data update computing device of the data update computing system shown in FIG. 1.

FIG. 5 illustrates an example configuration of data update computing device 110. Data update computing device 110 includes a processor 505 for executing instructions. Instructions are stored in a memory device 510, for example. Processor 505 includes one or more processing units (e.g., in a multi-core configuration).

In the example embodiment, processor 505 is operable to execute GUID generation module 530, encryption/decryption module 535, and query module 540. Modules 530, 535, and 540 may include specialized instruction sets, coprocessors, and/or kernel extensions. In the example embodiment, GUID generation module 530 generates GUIDs based at least in part on a random number generator. For example, GUID generation module 530 may include a hardware random number generator.

Encryption/decryption module 535 is configured to encrypt and decrypt data, for example based on public and/or private keys. In the example embodiment, encryption/decryption module 535 is used to encrypt GUID 216 and/or updated values 218 for transmission to relying party 130, as described above. Further, encryption/decryption module 535 may be used to decrypt payloads sent by the relying party 130. In one embodiment, encryption/decryption module 535 includes specialized instructions configured to cause processor 505 to encrypt/decrypt stored data. In another embodiment, encryption/decryption module 535 may include an encryption/decryption optimized coprocessor connected to processor 505.

Query module 540 is configured to populate specific queries to perform, for example, the operations described above with respect to database 116, to provide the queries for execution against database 116 via a storage interface 520, and to process query results received via storage interface 520.

In the example embodiment, processor 505 is operatively coupled to a public network interface 515 and a private network interface 516 such that data update computing device 110 is capable of communicating with user computing device 140 and/or relying party computing device 130. In some embodiments, network interface 515 and/or network interface 516 is a virtual interface, such as a virtual private network (VPN) adapter. In certain embodiments, each of network interface 515 and network interface 516 is associated with a respective network address, such as an IP ("internet protocol") address. In other embodiments, network interface 515 and/or network interface 516 are associated with physical network links. For example, network interface 515 may receive network packets from a user computing device 140 or relying party computing device 130 via Ethernet, using a switching device.

Processor 505 is operatively coupled to a storage device 525 on which database 116 is hosted. Storage device 525 is any computer-operated hardware suitable for storing and/or retrieving data. In some embodiments, storage device 525 is integrated in data update computing device 110. For example, data update computing device 110 may include one or more hard disk drives in one or more local or remote locations as storage device 525. In other embodiments, storage device 525 is external to data update computing device 110 and is accessible by a plurality of host computing devices. For example, storage device 525 may include multiple storage units such as hard disks or solid state disks in a redundant array of inexpensive disks (RAID) configuration. Storage device 525 may include a storage area network (SAN) and/or a network attached storage (NAS) system.

In some embodiments, processor 505 is operatively coupled to storage device 525 via storage interface 520. Storage interface 520 is any component capable of providing processor 505 with access to storage device 525. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 525.

Memory devices 410 (shown in FIG. 4) and 510 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 6:
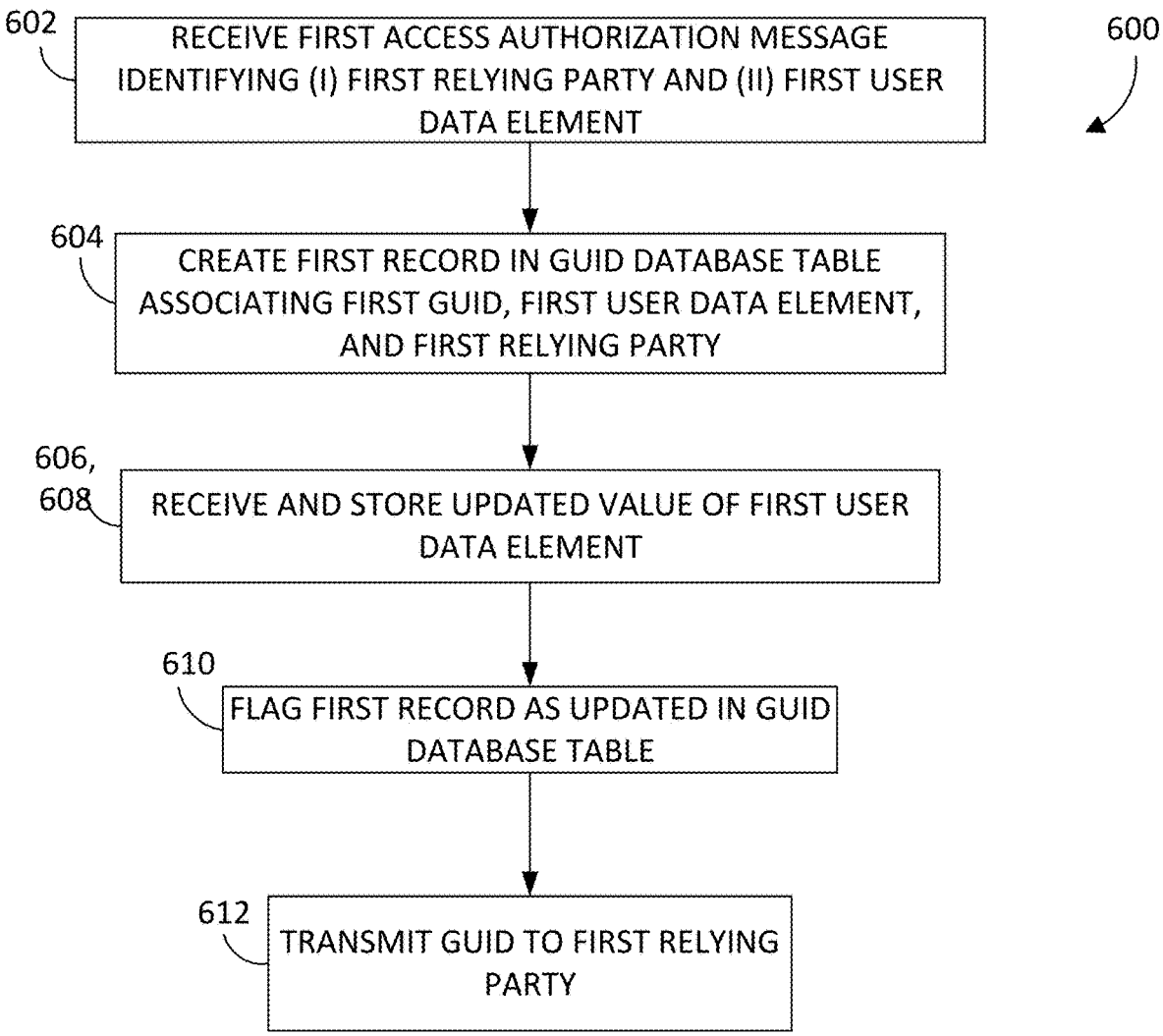
FIG. 6 is a flowchart illustrating an example method for propagating updates to user profile data, which may be implemented using the data update computing device shown in FIG. 1.

FIG. 6 is a flowchart illustrating an example method 600 for propagating updates to user profile data that includes user data elements of a user. For example, the method is implemented using data update computing device 110 in communication with database 116. In the example embodiment, method 600 includes receiving 602, from one of user computing device 140 and a first relying party computing device 130, a first access authorization message 220. First access authorization message identifies (i) a first relying party and (ii) a first of the user data elements of the user to be shared with the first relying party. Method 600 further includes creating 604, in response to the first access authorization message, a first record 120 in GUID database table 118. The first record associates a first GUID 216, the first user data element, and the first relying party. Method 600 further includes receiving 606 and storing 608 in the database an updated value 218 of the first user data element. Additionally, method 600 includes flagging 610 the first record as updated in the GUID database table, and transmitting 612 the GUID to the first relying party. In some embodiments, method 600 includes further steps consistent with the operations of data update computing device 110 as described above.

In one embodiment, a computer program is provided, and the program is embodied on a computer-readable medium. In an example embodiment, the system is executed on a single computer system, without requiring a connection to a server computer. In a further example embodiment, the system is run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Apple Inc. located in Cupertino, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, the computer program utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus, are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database implementation (e.g., relational, document-based) may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

As will be appreciated based on the foregoing specification, the above-described examples of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed examples of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

This written description uses examples to describe embodiments of the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A data update computing device comprising at least one processor in communication with a memory device and a database, the database storing values for a plurality of user data elements of a plurality of users, the memory device storing instructions that are executable by the at least one processor to cause the at least one processor to:
   receive, from one of a user computing device and a first relying party computing device, a first access authorization message, wherein the first access authorization message identifies (i) a first relying party and (ii) a label for a first user data element of a first user of the plurality of users, the first access authorization message indicating that updates to the value of the first user data element are to be shared with the first relying party;
   create, in response to the first access authorization message, a first record in a globally unique identifier (GUID) database table in the database, the GUID database table containing a plurality of records, each of the records associating a respective GUID, a corresponding label of one of the user data elements of one of the users, and a corresponding relying party, wherein the first record associates a first GUID, the label of the first user data element, and the first relying party, and wherein each of the GUIDs in the GUID database table is unique;
   receive, and store in the database, an updated value of the first user data element of the user;
   flag the first record as updated in the GUID database table;
   receive, from the first relying party computing device, an update status request identifying the first relying party;
   parse the GUID database table to identify flagged records associated with the first relying party, including the first record;
   extract the first GUID from the first record for transmission to the first relying party; and
   transmit the first GUID to the first relying party.

2. The data update computing device of claim 1, wherein the instructions are further executable by the at least one processor to cause the at least one processor to transmit the first GUID in response to:
   retrieving, from the database, a watch list comprising a plurality of subscribed relying parties, each of the subscribed relying parties having authorization to receive updates associated with at least one of the plurality of users;
   identifying the first relying party in the watch list;
   parsing the GUID database table to identify flagged records associated with the first relying party, including the first record; and
   extracting the first GUID from the first record for transmission to the first relying party.

3. The data update computing device of claim 1, wherein the instructions are further executable by the at least one processor to cause the at least one processor to, prior to transmitting the GUID to the first relying party:
   encrypt the first GUID in a first encryption layer using a private key A associated with the data update computing device to generate an A-encrypted first GUID; and
   encrypt the A-encrypted first GUID in a second encryption layer using a public key B associated with the first relying party to generate a double-encrypted first GUID, wherein transmitting the first GUID comprises transmitting the double-encrypted first GUID to the first relying party.

4. The data update computing device of claim 1, wherein the instructions are further executable by the at least one processor to cause the at least one processor to:
   transmit the first GUID by transmitting an update list including the first GUID to the first relying party;
   receive, in response to transmitting the update list, an update pull request from the first relying party, the update pull request including the first GUID; and
   transmit, in response to the update pull request, the updated value to the first relying party.

5. The data update computing device of claim 1, wherein the instructions are further executable by the at least one processor to cause the at least one processor to transmit the updated value to the first relying party simultaneously with the transmission of the first GUID.

6. The data update computing device of claim 1, wherein the instructions are further executable by the at least one processor to cause the at least one processor to transmit the updated value to a representational state transfer (REST)-compliant endpoint maintained by the first relying party.

7. The data update computing device of claim 1, wherein the instructions are further executable by the at least one processor to cause the at least one processor to:
encrypt the updated value in a first encryption layer using a private key A associated with the data update computing device to generate an A-encrypted updated value;
encrypt the A-encrypted updated value in a second encryption layer using a public key B associated with the first relying party to generate a double-encrypted updated value; and
transmit the double-encrypted updated value to the first relying party.

8. The data update computing device of claim 1, wherein the first access authorization message further includes an authentication key, and wherein the instructions are further executable by the at least one processor to cause the at least one processor to validate that the user authorizes the first relying party to access the first user data element based on the authentication key.

9. The data update computing device of claim 1, wherein the instructions are further executable by the at least one processor to cause the at least one processor to:
receive, from one of the user computing device and a second relying party computing device, a second access authorization message, wherein the second access authorization message identifies (i) a second relying party and (ii) the first user data element;
create, in response to the second access authorization message, a second record in the GUID database table, wherein the second record associates a second globally unique identifier (GUID), the first user data element, and the second relying party;
in response to receiving and storing the updated value of the first user data element, flag the second record as updated in the GUID database table; and
transmit the second GUID to the second relying party.

10. A computer-implemented method for propagating updates to user profile data, the user profile data comprising values for a plurality of user data elements of a plurality of users, the method implemented using a data update computing device in communication with a database storing the user profile data, the method comprising:
receiving, from one of a user computing device and a first relying party computing device, a first access authorization message, wherein the first access authorization message identifies (i) a first relying party and (ii) a label for a first user data element of a first user of the plurality of users, the first access authorization message indicating that updates to a value of the first user data element are to be shared with the first relying party;
creating, in response to the first access authorization message, a first record in a globally unique identifier (GUID) database table in the database, the GUID database table containing a plurality of records, each of the records associating a respective GUID, a corresponding label of one of the user data elements of one of the users, and a corresponding relying party, wherein the first record associates a first GUID, the label of the first user data element, and the first relying party, and wherein each of the GUIDs in the GUID database table is unique;
receiving, and storing in the database, an updated value of the first user data element of the user;
flagging the first record as updated in the GUID database table;
receiving, from the first relying party computing device, an update status request identifying the first relying party;
parsing the GUID database table to identify flagged records associated with the first relying party, including the first record;
extracting the first GUID from the first record for transmission to the first relying party; and
transmitting the first GUID to the first relying party.

11. The method of claim 10, wherein transmitting the first GUID further comprises:
retrieving, from the database, a watch list comprising a plurality of subscribed relying parties, each of the subscribed relying parties having authorization to receive updates associated with at least one of the plurality of users;
identifying the first relying party in the watch list;
parsing the GUID database table to identify flagged records associated with the first relying party, including the first record; and
extracting the first GUID from the first record for transmission to the first relying party.

12. The method of claim 10, further comprising, prior to transmitting the GUID to the first relying party:
encrypting the first GUID in a first encryption layer using a private key A associated with the data update computing device to generate an A-encrypted first GUID; and
encrypting the A-encrypted first GUID in a second encryption layer using a public key B associated with the first relying party to generate a double-encrypted first GUID, wherein transmitting the first GUID comprises transmitting the double-encrypted first GUID to the first relying party.

13. The method of claim 10, further comprising:
encrypting the updated value in a first encryption layer using a private key A associated with the data update computing device to generate an A-encrypted updated value; and
encrypting the A-encrypted updated value in a second encryption layer using a public key B associated with the first relying party to generate a double-encrypted updated value; and
transmitting the double-encrypted updated value to the first relying party.

14. A non-transitory computer readable medium that includes computer-executable instructions for propagating updates to user profile data comprising values for a plurality of user data elements of a plurality of users, wherein when executed by at least one processor of a data update computing device, the at least one processor in communication with a database storing the user profile data, the computer-executable instructions cause the at least one processor to:
receive, from one of a user computing device and a first relying party computing device, a first access authorization message, wherein the first access authorization message identifies (i) a first relying party and (ii) a label for a first user data element of a first user of the plurality of users, the first access authorization message indicating that updates to a value of the first user data element are to be shared with the first relying party;
create, in response to the first access authorization message, a first record in a-globally unique identifier (GUID) database table in the database, the GUID database table containing a plurality of records, each of the records associating a respective GUID, a corresponding label of one of the user data elements of one of the users, and a corresponding relying party, wherein the first record associates a first GUID, the label of the first user data element, and the first relying party, and wherein each of the GUIDs in the GUID database table is unique;

receive and store in the database an updated value of the first user data element of the user;

flag the first record as updated in the GUID database table;

receive, from the first relying party computing device, an update status request identifying the first relying party;

parse the GUID database table to identify flagged records associated with the first relying party, including the first record;

extract the first GUID from the first record for transmission to the first relying party; and transmit the first GUID to the first relying party.

15. The non-transitory computer readable medium of claim 14, wherein the computer-executable instructions further cause the at least one processor to transmit the updated value to the first relying party simultaneously with the transmission of the first GUID.

16. The non-transitory computer readable medium of claim 14, wherein the first access authorization message further includes an authentication key, wherein the computer-executable instructions further cause the at least one processor to validate that the first user authorizes the first relying party to access the first user data element based on the authentication key.

17. The non-transitory computer readable medium of claim 14, wherein the computer-executable instructions further cause the at least one processor to:

receive, from one of the user computing device and a second relying party computing device, a second access authorization message, wherein the second access authorization message identifies (i) a second relying party and (ii) the first user data element;

create, in response to the second access authorization message, a second record in the GUID database table, wherein the second record associates a second globally unique identifier (GUID), the label for the first user data element, and the second relying party;

in response to receiving and storing the updated value of the first user data element, flag the second record as updated in the GUID database table; and transmit the second GUID to the second relying party.

* * * * *